United States Patent Office 3,101,279
Patented Aug. 20, 1963

3,101,279
FLAME PROOFING OF CELLULOSIC
MATERIALS
George M. Wagner, Lewiston, and Paul E. Hoch, Youngstown, N.Y., assignors to Hooker Chemical Corporation, Niagara Falls, N.Y., a corporation of New York
No Drawing. Filed Nov. 21, 1960, Ser. No. 70,389
17 Claims. (Cl. 117—137)

This invention relates to compositions for treating cellulosic materials, to a process for the preparation of flame retardant cellulosic materials and to the compositions produced thereby.

Methylol-phosphorus polymers which have nitrogen atoms incorporated in the polymers are known to have excellent flame retarding properties. Such polymers are particularly suitable in the treatment of cellulosic materials such as cotton, rayon, wool, jute, ramie, paper, cardboard and the like. Numerous processes have been developed for treating cellulosic materials with these polymers. For example, in one process a cellulosic material such as cotton cloth is impregnated with an aqueous resin solution containing tetrakis(hydroxymethyl)phosphonium chloride and methylolmelamine, the impregnated cloth is dried and then reacted with ammonium hydroxide. Although this technique may be employed to produce a flame-proof cloth, nevertheless, the resulting cloth has a hard finish, since the reaction between ammonia and the methylol-phosphorus polymer is extremely rapid, and a hard, nitrogen-containing polymer forms on the surface of the cloth and blocks or prevents further reaction of ammonia with the methylol-phosphorus polymer on the interior of the cloth fibers. As a result, the polymer on the cloth is not uniform. Furthermore, such a process is undesirable from a commercial standpoint, since the cloth must be treated with two separate solutions, and two separate drying steps must be employed.

In another process an acid catalyst such as sulfuric acid is employed to effect polymerization of a hydroxymethyl phosphonium compound such as tetrakis(hydroxymethyl)-phosphonium chloride, in the treatment of cellulosic materials such as cellulosic textiles. However, the polymerization rate is difficult to control in these processes, and as a result the textile has a relatively hard finish. In addition the fire retarding properties of the treated cloth are not readily retained after frequent launderings and ironings of the cloth. Furthermore, the polymer-containing solution is relatively unstable and must be frequently replaced, thereby adding significantly to the cost of treating the cloth.

In these and other similar reactions wherein polymers containing nitrogen and phosphorus are formed from hydroxyorgano phosphonium chloride compounds and nitrogen-containing compounds, the rapid rate of polymerization has created serious problems when these processes are applied on a commercial scale. While we do not wish to be bound by theory, it is believed that the rapid rate of polymerization in these processes is caused, at least in part, by the presence of an aldehyde such as formaldehyde, which is formed in some stage of the polymerization reaction. We have discovered that when an aldehyde-combining substance is admixed with the hydroxyorgano phosphonium chloride compound, either prior to or simultaneous with the reaction of the phosphonium compound with a nitrogen-containing compound, a marked inhibition of the rate of polymerization is obtained.

It is an object of this invention to provide a novel polymerization inhibitor capable of inhibiting the formation of polymers containing phosphorus and nitrogen.

A further object of the invention is to provide a novel method for inhibiting the rate of polymerization of hydroxyorgano phosphonium chloride compounds and nitrogen-containing compounds.

Still another object of the invention is to provide novel compositions for treating cellulosic materials.

It is a further object of this invention to provide an improved process for preparing flame retardant cellulosic materials.

A further object of this invention is to provide improved flame retardant cellulosic materials.

Still another object of the invention is to provide a method of controlling the rate of polymerization between hydroxyorgano phosphonium chloride compounds and nitrogen-containing compounds.

It is another object of the invention to provide an improved catalyst composition to effect polymerization between hydroxyorgano phosphonium chloride and nitrogen-containing compounds.

Another object of the invention is to provide flame-retardant cellulosic textiles having improved hand and other physical properties.

A further object of the invention is to provide a stable solution for rendering cellulosic materials flame-retardant.

It is still another object of the invention to provide resin-coated cellulosic textiles which retain their flame-retardant characteristics after frequent launderings.

These and other objects of the invention will be apparent from the following detailed description.

It has now been discovered that when a substance capable of combining with an aldehyde is admixed with a strong acid salt and a hydroxyorgano phosphonium chloride compound having the formula

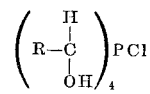

where R is as defined below, and the resulting mixture is reacted with a nitrogen-containing compound to yield a polymer containing nitrogen and phosphorus, there is a marked inhibition of the rate of polymerization. If desired, the substance capable of combining with an aldehyde and the strong acid salt may be admixed simultaneously with the hydroxyorgano phosphonium chloride compound and the nitrogen-containing compound. Because of the polymerization inhibiting effects of the mixture of the hydroxyorgano phosphonium chloride compound and the aldehyde-combining substance, aqueous solutions containing this mixture, a strong acid salt and a nitrogen-containing compound are highly stable, and do not readily polymerize or solidify unless subjected to an elevated temperature. As a result, it is now possible to impregnate cellulosic materials with aqueous solutions containing the hydroxyorgano phosphonium chloride compound, the aldehyde-combining substance, the strong acid salt and the nitrogen-containing compound and thereby obtain a more complete penetration of the cellulosic material with the resulting polymer. It has been further discovered that flame-retardant cellulosic materials having improved physical properties can be prepared by impregnating the cellulosic material to be treated with an aqueous resin solution containing a hydroxyorgano phosphonium chloride compound having the formula defined below, a water soluble cyclic nitrogen-containing compound, a substance capable of combining with an aldehyde, and a strong acid salt of a material selected from the group consisting of magnesium, zinc, and tertiary amines, and then drying and curing the resulting resin impregnated cellulosic material. When a cellulosic textile is treated in accordance with the instant invention, the resin impregnated textile has markedly improved hand, tear strength, tensile strength and flame-retarding properties, when compared with textiles treated with resins by techniques of the prior art. In addition, the novel aqueous resin solution has a high degree of stability.

The term "hydroxyorgano phosphonium chloride compound" is used throughout the description to define water soluble tetrakis(α-hydroxyorgano)phosphonium chloride compounds having the formula

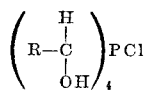

where R is a hydrogen, lower alkyls having between about one and about three carbon atoms, chlorinated lower alkyls having between about one and about three carbon atoms, lower alkenyls having two or three carbon atoms and chlorinated lower alkenyls having two to three carbon atoms. Typical examples of suitable water-soluble hydroxymethyl phosphonium compounds are tetrakis(hydroxymethyl)phosphonium chloride, tetrakis(α-hydroxyethyl)phosphonium chloride, tetrakis(α-hydroxypropyl)-phosphonium chloride, tetrakis(α-hydroxypropenyl)phosphonium chloride, tetrakis(α-hydroxybutenyl)phosphonium chloride and mixtures thereof. The phosphonium compound may be used in monomer form or in a partially polymerized form, so long as it is still water-soluble. For example, tetrakis(hydroxymethyl)phosphonium chloride may be heated to effect partial polymerization before dissolving in the aqueous solution.

Suitable substances capable of combining with aldehyde produced by polymerization of a hydroxyorgano phosphonium chloride compound with a nitrogen-containing compound include inorganic sulfites, tertiary amine sulfites, secondary amines, primary amines, reactive methylene compounds having active hydrogens, and mixtures thereof. Typical examples of suitable inorganic sulfites include ammonium sulfite, ammonium bisulfite, sodium sulfite, sodium bisulfite, potassium sulfite, potassium bisulfite, lithium sulfite, lithium bisulfite, and mixtures thereof, alkaline earth metal sulfites such as calcium sulfite, calcium bisulfite, barium sulfite, barium bisulfite, magnesium sulfite and mixtures thereof.

Typical examples of suitable tertiary amine sulfites and tertiary amine bisulfites include the sulfites and bisulfites of tertiary amines such as triethanol amine, triisopropyl amine, triethyl amine, tripropanol amine, tributyl amine, and mixtures thereof. The term "sulfite" as used throughout the description and claims is intended to include sulfites, bisulfites and mixtures thereof.

Typical examples of suitable primary amines include methylamine, propylamine, octylamine, decylamine, ethanolamine, propanolamine, cyclic amines such as, cyclopentylamine, cyclohexylamine and alkyl substituted derivatives thereof, and such substances as semi-carbazides, hydrazides, hydrazines and amino guanidine.

Typical examples of suitable secondary amines include dialkylamines, such as dimethylamine, diethylamine, dibutylamine, diamylamine, dioctylamine, didecylamine, etc.; methylethylamine, ethylbutylamine, etc.; cyclic amines such as morpholine, piperidine, cyclohexylmethylamine, cyclopentylethylamine and the like. Also included are diarylamines, such as diphenylamine and ditoluylamine; arylalkylamines, such as methylphenylamine and octylphenylamine; dialkanolamines such as diethanolamine, dibutanolamine, dioctanolamine, etc.; and mixed dialkanolamines such as isopropanolethanolamine, etc.; and mixed alkylalkanolamines such as ethylethanolamine, butylethanolamine, octylethanolamine, etc., methylisopropanolamine, and ethylbutanolamine, etc., and the like.

Typical examples of suitable reactive methylene compounds having acidic hydrogen include acetyl acetone, 1,3-cyclopentadione, and 1,3-cyclohexadione.

If desired, a polymerization inhibiting effect can be obtained by contacting gaseous sulfur dioxide with an aqueous solution containing hydroxyorgano phosphonium chloride compound under alkaline conditions sufficient to convert $SO_2$ to the sulfite ion.

The substance capable of combining with an aldehyde is admixed with the hydroxyorgano phosphonium chloride compound in a proportion equivalent to between about 0.9 and about two moles, and preferably between about one and about 1.4 moles per mole of the hydroxyorgano phosphonium chloride compound. However, any proportion capable of inhibiting the polymerization of the hydroxyorgano phosphonium chloride compound and the nitrogen-containing compound may be employed.

Water soluble cyclic nitrogen-containing compounds suitable for use in the instant invention include triazine and dimethylol cyclic alkylene ureas. Typical examples of suitable triazines include methylolmelamine, dimethyloltriazone, modified methylolmelamines, such as the trimethyl ether of methylolmelamine and mixtures thereof. Typical examples of suitable cyclic alkylene ureas include dimethylolethylene urea and dimethylolpropylene urea.

Strong acid salts suitable for use in the instant invention include magnesium salts of strong acids, zinc salts of strong acids, and tertiary amine salts of strong acids. Strong inorganic acids capable of yielding the salts contemplated in the instant invention include sulfuric, phosphoric, hydrochloric, hydrobromic, hydroiodic, and nitric acids, and mixtures thereof. Typical examples of suitable magnesium salts of strong acids include magnesium sulfate, magnesium phosphate, magnesium chloride, magnesium nitrate, and mixtures thereof. Typical examples of suitable zinc salts include zinc sulfate, zinc phosphate, zinc chloride, zinc bromide, zinc nitrate and mixtures thereof. Typical examples of suitable strong acid salts of tertiary amines include triethanolamine-sulfate, triethylamine - hydrochloride, triethanolamine - sulfate, triethanolamine-hydrochloride, triisopropanolamine-sulfate, triisopropanolamine-hydrochloride, and the like.

If desired, a small proportion of a nitrogen-containing salt of the aforesaid strong inorganic acid may also be employed as a component of the aqueous resin solution. For example, ammonium salts of strong acids, primary amine salts of strong acids, aromatic amine salts of strong acids and cyclic amine salts of strong acids may also be employed with the strong acid salts of magnesium, zinc, and tertiary amines.

Urea may be added in a proportion up to about ten percent, preferably between about one and about five percent by weight of the aqueous resin solution to improve the char characteristics of the resulting treated cellulosic material, but it is not necessary to add urea if satisfactory char characteristics are otherwise obtained.

The approximate proportions of the aforesaid components used in preparing the aqueous resin solution are as follows.

| Component: | Proportion |
|---|---|
| Hydroxyorgano phosphonium chloride compound | 10 to 30 percent by weight. |
| Cyclic nitrogen-containing compound | 5 to 15 percent by weight. |
| Strong acid salt of magnesium, zinc, or tertiary amines | 1 to 10 percent by weight. |
| Water | 35 to 70 percent by weight. |
| Urea | 0 to 10 percent by weight. |
| Sulfite compound capable of combining with an aldehyde | 0.9 to 2 moles per mole of hydroxyorgano phosphonium chloride compound. |
| Nitrogen-containing salt of a strong acid | 0 to 0.15 gram-atoms of nitrogen in the salt per mole of hydroxyorgano phosphonium cholride compound. |

The aqueous resin solution is prepared by admixing the aforesaid non-aqueous components with water, employing sufficient agitation to substantially completely dissolve all of the non-aqueous components. It is preferred to employ water in a proportion equivalent to between about forty-five and about fifty-five percent by weight of the aqueous resin solution. When a nitrogen-containing salt is employed it is preferred to employ a proportion equivalent to between about 0.05 and about 0.15 gram-atoms of nitrogen per mole of hydroxyorgano phosphonium chloride compound. Any convenient order of mixing of the components of the aqueous resin solution may be employed. For example, the non-aqueous components may be added simultaneously to the water with agitation. If desired, when a nitrogen-containing salt of a strong acid is employed as a component of the aqueous resin solution, the other non-aqueous components are first dissolved in the water and the nitrogen-containing salt of a strong acid is then dissolved in the aqueous solution. Greater or lesser proportions of the aforesaid ingredients may be employed so long as the rate of polymer formation is sufficiently controlled to yield a substantially uniform polymer on the cellulosic material, and so long as the solution contains sufficient resin to provide the cellulosic material with an adequate resin add-on. The aqueous resin solution is highly stable and may be used for eleven hours or more before any noticeable degree of polymerization occurs within the aqueous resin solution, even though a small proportion of a nitrogen-containing salt of a strong acid may be present. Although the proportion of nitrogen-containing salt of a strong acid employed is insufficient to effect complete polymerization of the resinous components, it has been discovered that the use of a strong acid salt of magnesium, zinc, or tertiary amine to supplement or replace the nitrogen-containing salt of a strong acid is sufficient to effect polymerization when a cellulosic material is treated with the aqueous resin solution in accordance with the instant novel process.

The proportion of resin add-on (dry basis), necessary to impart the aforesaid improved characteristics to the cellulosic material is generally between about ten and about thirty percent by weight of the cellulosic material.

Various techniques can be employed for impregnating the cellulosic material with the aqueous resin solution. In one embodiment of the invention, the hydroxyorgano phosphonium chloride compound, cyclic nitrogen-containing compound, sulfite compound, strong acid salt of magnesium, zinc, or tertiary amine, and if desired, a nitrogen-containing salt of a strong acid are dissolved in water simultaneously, and the resulting aqueous resin solution is fed to a suitable container such as a padding box. The textile or other cellulosic material to be treated is immersed in the resulting solution. After the cellulosic material is impregnated with the aqueous resin solution, it is passed through squeeze rolls or other means for removing excess solution. The textile impregnated with the aqueous resin solution may be heated or otherwise treated to remove excess water, and to effect curing of the resin on the textile. Drying of the treated cloth can be effected in a conventional forced hot air oven at a temperature between about ninety and about one hundred and ten degrees centigrade, for between about one and about ten minutes, and curing of the resin can be effected in the same apparatus at a temperature of between about one hundred and twenty and about one hundred and fifty degrees centigrade, for between about one and about ten minutes. However, any temperature and time conditions under which substantially all of the free water is removed and the resin is cured may be employed. For example, the dry resin-coated textile may be cured in an infrared oven where the treated cloth is exposed to an elevated temperature, for example, between about five hundred and about seven hundred degrees Fahrenheit for between about five and about ten seconds.

After drying and curing, the resin impregnated cellulosic textile is then scoured to remove excess sulfite, unpolymerized resin, and the anion of the salt of a strong acid. Scouring of the treated material may be effected by immersing the treated cellulosic textile in an aqueous soap solution containing a small proportion of soap and a small proportion of sodium carbonate. The scoured resin-treated textile is then dried as described above.

The polymer or resin which impregnates the cellulosic material is the reaction product of the hydroxyorgano phosphonium compound, the cyclic nitrogen-containing compound, the strong acid salt of magnesium, zinc, or tertiary amine, and, if desired, the nitrogen-containing salt of a strong acid and urea. When a cellulosic material is impregnated with the resinous material in accordance with the instant invention employing resin forming ingredients in the proportions defined above, the resinous material is the reaction product formed from resin forming ingredients comprised of the hydroxyorgano phosphonium chloride compound in a proportion equivalent to between about twenty and about eighty-five percent, the cyclic nitrogen-containing compound in a proportion equivalent to between about ten and about sixty percent by weight, the strong acid salt of magnesium, zinc, or tertiary amine in a proportion equivalent to between about two and about forty percent by weight, and if desired, the nitrogen-containing salt of a strong acid in a proportion equivalent to between about zero and about six percent by weight, and urea in a proportion equivalent to between about zero and about forty percent by weight of the resin forming ingredients.

In a preferred embodiment of the invention an aqueous resin solution is prepared from the following components in the following proportions.

| Component: | Proportions |
|---|---|
| Tetrakis(hydroxyethyl) phosphonium chloride | 10 to 30 percent by weight. |
| Methylolmelamine | 5 to 15 percent by weight. |
| Magnesium chloride | 1 to 10 percent by weight. |
| Water | 45 to 55 percent by weight. |
| Urea | 1 to 7 percent by weight. |
| Sodium sulfite | 0.9 to 1.4 moles per mole of tetrakis (hydroxymethyl)-phosphonium chloride. |

Component:                  Proportions
  Ammonium sulfate___ 0 to 0.15 gram-atoms of nitrogen as ammonium sulfate per mole of tetrakis-(hydroxymethyl)phosphonium chloride.

Cellulosic textiles treated in accordance with the instant invention have an improved hand, have improved tensile strength, and improved tear strength because of the substantially uniform polymer composition throughout the cloth. In addition, since the polymer is distributed more uniformly throughout the cloth, improved flame-retardance can be obtained with a smaller proportion of resin add-on than is required by previously known techniques.

The following examples are presented to define the invention more fully without any intention of being limited thereby. All parts and percentages are by weight unless otherwise indicated.

EXAMPLES 1-12

Twelve aqueous resin solutions were prepared in accordance with the instant invention, employing various components in the proportions set forth below in the table. Twelve cloth samples, as defined in the table, were each weighed, impregnated with one of the aqueous resin solutions, and then re-weighed to determine the percent wet pick-up. The wet cloth samples were each heated for four minutes at a temperature of about one hundred and fifty degrees centigrade, to effect drying of the cloth and curing of the resin. The resin impregnated cloth samples, after scouring and drying, were then weighed again to establish the percent resin add-on.

The tear strength was determined in accordance with the procedure of the Elmendorf tear test, Federal Specification CCC-T-191b No. 5132. The tensile strength was determined in accordance with Federal Specification CCC-T-191b No. 5100, using a Scott tensile tester. Each resin coated cloth sample was subjected to the standard char test in accordance with the procedure of the American Association of Textile Chemists and Colorists, Test AATCC 34-1952. In this test, a strip of cloth to be tested is secured on each of its long sides in a vertical position, leaving an exposed area of approximately ten inches by two and one-quarter inches. A Bunsen burner is positioned below the bottom of the cloth so that the top of the burner is about three-quarters of an inch from the cloth, and so that the burner produces a flame which is about one and one-half inches high. The flame is produced by burning natural gas in the absence of air. The cloth is exposed to the flame for a period of twelve seconds, and the flame is then turned off. The cloth is then removed from the securing means, and a weight is attached to one side of the char, the weight being equivalent to about ten percent of the tear strength of the cloth. The opposite side of the cloth is then pulled to produce a tear along the char. The length of the tear is then measured to determine the char in inches.

In Examples 3, 4, 5, 6, 8 and 9, 11 and 12, the resin coated cloth samples were boiled in an aqueous solution of about 0.2 percent soap, and about 0.2 percent sodium carbonate for the period indicated in the table, then dried, and subjected to the standard char test. The results of these tests are set forth in the following table.

Table

| Example | 1 | 2 | 3 | 4 [a] | 5 | 6 [b] |
|---|---|---|---|---|---|---|
| Percent tetrakis(hydroxymethyl) phosphonium chloride | 18.0 | 18.0 | 20.0 | 20.0 | 18.0 | 20.0 |
| Percent trimethylolmelamine | 11.3 | 11.3 | 12.5 | 12.5 | 11.3 | 12.5 |
| Percent urea | 2.3 | 2.3 | 2.5 | 2.5 | 2.3 | 2.5 |
| Percent $Na_2SO_3$ | 12.6 | 12.6 | 14.0 | 14.0 | 12.6 | 14.0 |
| Percent $Na_2S_2O_5$ | 1.26 | 1.4 | 1.4 | 1.4 | 1.26 | 1.4 |
| Catalyst | $MgCl_2$ | $MgCl_2$ | $MgCl_2$ | $MgCl_2$ | $MgCl_2$ | $MgCl_2$ |
| Percent catalyst | 5.0 | 1 | 1.5 | 1.5 | 1.35 | 1.5 |
| Percent $(NH_4)_2SO_4$ | 0.0 | 0.0 | 0.5 | 0.5 | 0.45 | 0.5 |
| Percent water | 49.5 | 53.6 | 47.6 | 47.6 | 52.7 | 47.6 |
| Soln. stability, hrs | >24 | >24 | >24 | >24 | >24 | ND |
| Type of cloth | Twill (6 oz) | Twill | Broadcloth (136/68) | Twill | Twill | Twill |
| Percent wet pick-up | 83 | 85 | 88 | 90 | 86 | 85 |
| Percent resin add-on | 18.2 | 17.5 | 22.8 | 20.9 | 18.8 | 18.9 |
| Char, inches | 5.0 | 5.0 | 3.8 | 4.5 | 4.8 | 4.8 |
| Tear, grams | 880 | 830 | 830 | 660 | 760 | 760 |
| Tensile strength, lbs | 80 | 73 | ND | ND | ND | ND |
| Char, inches, after 3 hr. boil | ND [1] | ND | 4.8 | 4.3 | 4.4 | 4.5 |

| Example | 7 | 8 | 9 | 10 | 11 | 12 |
|---|---|---|---|---|---|---|
| Percent tetrakis(hydroxymethyl) phosphonium chloride | 22.0 | 22.0 | 22.0 | 22.0 | 18.0 | 24. |
| Percent trimethylolmelamine | 13.7 | 13.7 | 13.7 | 13.7 | 11.3 | 15. |
| Percent urea | 2.7 | 2.7 | 2.7 | 2.7 | 2.3 | 3. |
| Percent $Na_2SO_3$ | 15.4 | 15.4 | 15.4 | 15.4 | 12.6 | 16.8 |
| Percent $Na_2S_2O_5$ | 1.5 | 1.5 | 1.5 | 1.5 | 1.26 | 1.7 |
| Catalyst | $Zn(NO_3)_2$ | $TEA.H_2SO_4$ [c] | $TEA.H_2SO_4$ [c] | $ZnCl_2$ | $MgCl_2$ | $MgCl_2$ |
| Percent catalyst | 1.5 | 8.4 | 8.4 | 1.0 | 1.4 | 1.9 |
| Percent $(NH_4)_2SO_4$ | 0.5 | 0.0 | 0.5 | 0.5 | 0.9 | 1.2 |
| Percent water | 42.7 | 36.3 | 35.8 | 43.2 | 52.2 | 36.4 |
| Soln. stability, hrs | ND | ND | ND | ND | ND | 11 |
| Type of cloth | Twill | Twill | Twill | Twill | Twill | Twill |
| Percent wet pick-up | 83 | 84 | 84 | 85 | 89 | 93 |
| Percent resin add-on | 18.3 | 19.5 | 20.5 | 17.3 | 19.5 | 26 |
| Char, inches | 5.0 | 4.8 | 4.1 | 4.8 | 4.5 | 3.5 |
| Tear, grams | 895 | 770 | 830 | 920 | 1,230 [e] | 1,080 [e] |
| Tensile strength, lbs | ND | ND | ND | ND | 77 | 83 |
| Char, inches, after 3 hr. boil | ND | 5.0 | 4.8 | ND | 4.6 [d] | 3.6 [f] |

[1] Not determined.
[a] Uncatalyzed solution 24 hrs. old. Catalyzed solution 24 hours old before pad.
[b] Catalyzed solution 24 hours old at time of padding.
[c] TEA.$H_2SO_4$=triethanolamine-sulfuric acid.
[d] After 4 hours boiling.
[e] Cloth top softened with 0.5% polyethylene softener.
[f] After 14 hours boiling.

Each cloth had a soft flexible hand after treatment which was only slightly different from the untreated cloth.

EXAMPLE 13

Sodium meta-bisulfite (9.5 grams) and calcium chloride (eleven grams) were dissolved in fifty grams of water. A precipitate of Ca(HSO$_3$)$_2$ formed immediately. Addition of ten grams of thirty-seven percent formaldehyde solubilized the Ca(HSO$_3$)$_2$ precipitate as the bisulfite addition product.

It will be recognized by those skilled in the art that various modifications within the invention are possible, some of which have been referred to above. Therefore, we do not wish to be limited except as defined by the appended claims.

We claim:

1. A process for preparing a flame retardant cellulosic material which comprises impregnating the cellulosic material with an aqueous resin solution of tetrakis(α-hydroxyorgano)phosphonium chloride compound, a water-soluble cyclic nitrogen-containing compound selected from the group consisting of triazines and dimethylol cyclic alkylene ureas, a strong acid salt of a material selected from the group consisting of magnesium, zinc, and tertiary amines, and a sulfite compound capable of combining with an aldehyde, whereby polymerization of the phosphonium compound, the cyclic nitrogen-containing compound and the strong acid salt is effected and there is formed an aldehyde which is prevented from accelerating the polymerization by combination of the aldehyde with the sulfite, and, thereafter, drying and curing the thus-impregnated cellulosic material.

2. A process for preparing a flame-retardant cellulosic material which comprises contacting a cellulosic material to be treated with an aqueous solution containing between about 35 and about 70 percent by weight of water, between about 10 and about 30 percent by weight of a tetrakis(α-hydroxyorgano)phosphonium chloride compound having the formula:

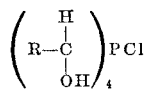

wherein R is selected from the group consisting of hydrogen, lower alkyl having between about 1 and about three carbon atoms, lower chlorinated alkyls having between about one and about three carbon atoms, lower alkenyls having from two to three carbon atoms, and lower chlorinated alkenyls having from two to three carbon atoms, between about 5 and about 15 percent by weight of a water-soluble cyclic nitrogen-containing compound selected from the group consisting of triazines and dimethylol cyclic alkylene ureas, between about 0.9 and about 2.0 moles of a sulfite compound capable of combining with an aldehyde per mole of phosphonium compound, between about 0 and about 10 percent by weight of urea, between about 1 and about 10 percent by weight of a strong acid salt of a material selected from the group consisting of magnesium, zinc, and tertiary amines, between about zero and about 0.15 gram-atoms of nitrogen as a nitrogen-containing salt of a strong inorganic acid per mole of the phosphonium chloride compound, whereby polymerization of the phosphonium compound, the cyclic nitrogen-containing compound, the urea, the strong acid salt and the nitrogen-containing compound is effected and there is formed an aldehyde which is prevented from accelerating the polymerization by combination of the aldehyde with the sulfite, and, thereafter, drying and curing the thus-treated cellulosic material.

3. The process as claimed in claim 2 wherein the phosphonium compound is tetrakis(hydroxymethyl)phosphonium chloride.

4. A process as claimed in claim 2 wherein the sulfite compound is an alkali metal sulfite.

5. The process as claimed in claim 4 wherein the alkali metal sulfite is sodium sulfite.

6. The process as claimed in claim 2 wherein the strong acid salt is magnesium chloride.

7. The process as claimed in claim 2 wherein the water-soluble cyclic nitrogen-containing compound is trimethylolmelamine.

8. A process for preparing a flame-retardant cellulosic textile which comprises contacting the cellulosic textile to be treated with an aqueous solution containing between about 35 and about 70 percent by weight of water, between about 5 and about 30 percent by weight of tetrakis(hydroxymethyl)phosphonium chloride, between about 5 and about 15 percent by weight of trimethylolmelamine, between about 1 and about 1.4 moles of sodium sulfite per mole of tetrakis(hydroxymethyl)phosphonium chloride, between about 1 and about 10 percent by weight of magnesium chloride, between about 0 and about 10 percent by weight of urea and between about 0.05 and about 0.15 gram-atoms of nitrogen as ammonium sulfate per mole of tetrakis(hydroxymethyl)phosphonium chloride, whereby polymerization of the tetrakis(hydroxymethyl)phosphonium chloride, trimethylolmelamine, urea, magnesium chloride, and ammonium sulfate, is effected and there is formed an aldehyde which is prevented from accelerating the polymerization by combination of the aldehyde with the sodium sulfite, and, thereafter, drying and curing the treated cellulosic material.

9. A flame-retarding cellulosic material comprised of a cellulosic material impregnated with a resin comprised of the polymerization product of a tetrakis(α-hydroxyorgano)phosphonium chloride compound, a water-soluble cyclic nitrogen-containing compound selected from the group consisting of triazines and dimethylol cyclic alkylene ureas, and a strong acid salt of a material selected from the group consisting of magnesium, zinc and tertiary amines, the resin polymerization product being formed in the presence of a sulfite compound capable of combining with an aldehyde, whereby an aldehyde is formed during the polymerization reaction which is prevented from accelerating the polymerization by combination of the aldehyde with the sulfite.

10. A flame-retardant cellulosic material comprised of a cellulosic material impregnated with a resin comprised of the polymerization product of between about 20 and about 85 percent by weight of a tetrakis(α-hydroxyorgano)phosphonium chloride compound having the formula:

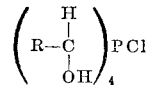

wherein R is selected from the group consisting of hydrogen, lower alkyls having between one and about three carbon atoms, lower chlorinated alkyls having between about one and about three carbon atoms, lower alkenyls having two to three carbon atoms, and lower chlorinated alkenyls having from two to three carbon atoms, between about 10 and about 60 percent by weight of a water-soluble cyclic nitrogen-containing compound selected from the group consisting of triazines and dimethylol cyclic alkylene ureas, between about 0 and about 40 percent by weight of urea, and between about 2 and about 40 percent by weight of a strong acid salt of a material selected from the group consisting of magnesium, zinc, and tertiary amines and a nitrogen-containing salt of a strong inorganic acid selected from the group consisting of ammonium salts of strong inorganic acids, primary amine salts of strong inorganic acids, aromatic amine salts of strong inorganic acids, aromatic amine salts of strong inorganic acids, aromatic amine salts of strong inorganic acids, and cyclic amine salts of strong inorganic acids in a proportion between about zero and about 0.15 gram-atoms of nitrogen, as the nitrogen-containing salt per mole of the phosphonium chloride compound, the resin polymerization product being formed in the presence of a sulfite compound capable of combining with an aldehyde, whereby an aldehyde is formed during the polymerization reaction which is prevented from accelerating the polymerization by combination of the aldehyde with the sulfite.

11. The cellulosic material as claimed in claim 10 wherein the resin add-on is between about 10 and about 30 percent by weight of the cellulosic material.

12. A flame-retardant cellulosic material comprised of a cellulosic material impregnated with a resin comprised of the polymerization product of tetrakis(hydroxymethyl) phosphonium chloride in a proportion equivalent to between about 20 and about 85 percent by weight, trimethylolmelamine in a proportion equivalent to between about 10 and about 60 percent by weight, urea in a proportion equivalent to between about 0 and about 40 percent by weight, between about 1 and 10 percent by weight of magnesium chloride and between about zero and about 0.15 gram-atoms of nitrogen as ammonium sulfate, per mole of tetrakis(hydroxymethyl)phosphonium chloride, the resin being formed in the presence of sodium sulfite, whereby an aldehyde is formed during the polymerization reaction which is prevented from accelerating the polymerization by combination of the aldehyde with the sodium sulfite.

13. A cellulosic material treating composition comprised of a tetrakis($\alpha$-hydroxyorgano)phosphonium chloride compound, a water-soluble cyclic nitrogen-containing compound seletced from the group consisting of triazines and dimethylol cyclic alkylene ureas, a strong acid salt of a material selected from the group consisting of magnesium, zinc and tertiary amines, a sulfite compound capable of combining with an aldehyde, and water, which composition reacts to form a polymerization product containing the phosphonium compound, the cyclic nitrogen-containing compound and the strong acid salt, and an aldehyde which is prevented from accelerating the polymerization by combination of the aldehyde with the sufite.

14. A textile treating composition comprised of between about 10 and about 30 percent by weight of a tetrakis-($\alpha$-hydroxyorgano)phosphonium chloride compound having the formula:

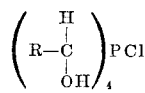

wherein R is selected from the group consisting of hydrogen, lower alkyls having between about one and about three carbon atoms, lower chlorinated alkyls having between about one and about three carbon atoms, lower alkenyls having from two to three carbon atoms, and lower chlorinated alkenyls having from two to three carbon atoms, between about 5 and about 15 percent by weight of a water-soluble cyclic-nitrogen-containing compound selected from the group consisting of triazines and dimethylol cyclicalkylene ureas, between about 1 and about 10 percent by weight of a strong acid salt of a material selected from the group consisting of magnesium, zinc and tertiary amines, between zero and about 10 percent by weight of urea, between about 35 and about 70 percent by weight of water, between 0.9 and about 2 moles of a sulfite compound capable of combining with an aldehyde, per mole of said phosphonium chloride compound, and between about zero and about 0.15 gram-atoms of nitrogen as a nitrogen-containing salt of a strong inorganic acid per mole of the phosphonium chloride compound, which composition reacts to form a polymerization product of the phosphonium compound, the cyclic nitrogen-containing compound, the nitrogen-containing salt, the strong acid salt and the urea, and an aldehyde which is prevented from accelerating the polymerization by combination of the aldehyde with the sulfite.

15. The composition as claimed in claim 14 wherein the sulfite compound is an alkali metal sulfite.

16. The composition as claimed in claim 14 wherein the sulfite compound is a tertiary amine sulfite.

17. A textile treating composition comprised of between about 10 and about 30 percent by weight of tetrakis(hydroxymethyl)phosphonium chloride, between about 5 and about 15 percent by weight of trimethylolmelamine, between about 1 and about 10 percent by weight of magnesium chloride, between about 0 and about 10 percent by weight of urea, between about 35 and about 70 percent by weight of water, between about 1 and about 1.4 moles of sodium sulfite per mole of tetrakis(hydroxymethyl)phosphonium chloride, and between about 0 and about 0.15 gram-atoms of nitrogen as ammonium sulfate per mole of tetrakis(hydroxymethyl)- phosphonium chloride, which composition reacts to form a polymerization product of the tetrakis(hydroxymethyl)- phosphonium chloride, the trimethylolmelamine, the ammonium sulfate, the magnesium chloride and the urea, and an aldehyde which is prevented from accelerating the polymerization by combination of the aldehyde with the sodium sulfite.

References Cited in the file of this patent
UNITED STATES PATENTS

| 2,870,041 | Waddle et al. | Jan. 20, 1959 |
| 2,993,746 | Miles et al. | July 25, 1961 |

FOREIGN PATENTS

| 1,937 | Great Britain | of 1864 |

OTHER REFERENCES

Guthrie et al.: "Application of the THPC Flame Retardant Process to Cotton Fabrics," Proceedings of the American Assoc. of Textile Chemists and Colorists, pp. 1–5, May 9, 1955.

UNITED STATES PATENT OFFICE
CERTIFICATE OF CORRECTION

Patent No. 3,101,279                                    August 20, 1963

George M. Wagner et al.

It is hereby certified that error appears in the above numbered patent requiring correction and that the said Letters Patent should read as corrected below.

Column 6, line 67, for "ethyl)" read -- methyl) --; columns 7 and 8, opposite "Percent $Na_2S_2O_5$", second column, fifth item, for "1.4" read -- 1.26 --; column 9, line 19, after "of" insert -- a --; column 11, line 31, for "seletced" read -- selected --.

Signed and sealed this 22nd day of September 1964.

(SEAL)
Attest:

ERNEST W. SWIDER                                      EDWARD J. BRENNER
Attesting Officer                                         Commissioner of Patents